US007836250B2

(12) United States Patent
Zohar et al.

(10) Patent No.: US 7,836,250 B2
(45) Date of Patent: Nov. 16, 2010

(54) AUTOMATIC REBALANCING OF A DATA STORAGE SYSTEM

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 11/182,338

(22) Filed: Jul. 15, 2005

(65) Prior Publication Data

US 2007/0016726 A1 Jan. 18, 2007

(51) Int. Cl.
*G06F 12/00* (2006.01)
*G06F 13/00* (2006.01)
*G06F 13/28* (2006.01)
*G06F 15/16* (2006.01)
*G06F 9/46* (2006.01)

(52) U.S. Cl. .................. 711/114; 711/151; 711/154; 711/E12.089; 709/235; 718/105

(58) Field of Classification Search .................. 711/114
See application file for complete search history.

(56) References Cited

U.S. PATENT DOCUMENTS

| 6,539,494 | B1 * | 3/2003 | Abramson et al. ............. 714/4 |
| 6,560,717 | B1 * | 5/2003 | Scott et al. .................... 714/4 |
| 6,578,068 | B1 | 6/2003 | Bowman-Amuah |
| 6,604,171 | B1 | 8/2003 | Sade |
| 6,651,082 | B1 * | 11/2003 | Kawase et al. ............. 718/105 |
| 6,886,074 | B1 | 4/2005 | Narayanaswamy et al. |
| 2003/0028720 | A1 * | 2/2003 | Lam et al. .................. 711/112 |
| 2003/0167385 | A1 * | 9/2003 | Lai et al. .................... 711/167 |
| 2004/0148195 | A1 * | 7/2004 | Kalies ............................ 705/2 |
| 2005/0015554 | A1 | 1/2005 | Zohar et al. |

OTHER PUBLICATIONS

Self-Monitoring Analysis and Reporting Technology (SMART) http://www.pcguide.com/ref/hdd/perf/qual/featuresSMART-c.html.

* cited by examiner

*Primary Examiner*—Matt Kim
*Assistant Examiner*—Michael Alsip
(74) *Attorney, Agent, or Firm*—Griffiths & Seaton PLLC (57) ABSTRACT

A method for operating a data storage system that includes a plurality of mass storage devices, which are configured to store data redundantly, the method including determining a characteristic service level of one or more of the mass storage devices and defining a reduced service level, which is less than the characteristic service level. The method further includes performing the following steps automatically: detecting the reduced service level on a first mass storage device in the data storage system; determining that data on the first mass storage device is stored redundantly on a second mass storage device in the data storage system; and in response to detecting the reduced service level, diverting an input/output (IO) request for the data directed to the first mass storage device to the second mass storage device, while operating the first mass storage device at the reduced service level.

17 Claims, 5 Drawing Sheets

| INTERFACE 28 | | | | |
|---|---|---|---|---|
| PARTITION NUMBER 30 | PARTITION ADDRESS RANGE 32 | PRIMARY LOCATION 34 | SECONDARY LOCATION 36 | 38 |
| 25/XXX1 | 25/L9FFFF1F0-LAFFFF1F0 | ... CACHE C9 | ... CACHE C1 | |
| 26/YYY2 | 26/LDEEEE2F8-LEEEEE2F8 | ... CACHE C9 | ... CACHE C5 | |
| 27/ZZZ3 | 27/LAFFFF2F1-LBFFFF2F1 | ... CACHE C1 | ... CACHE C5 | |
| 28/WWW1 | 28/LCFFFF3F2-LFFFFF3F2 | ... CACHE C1 | ... CACHE C9 | |

AUTOMATIC REBALANCING OF A DATA STORAGE SYSTEM

FIELD OF THE INVENTION

The present invention relates generally to data storage systems, and specifically to actions taken to maintain the system in a balanced state.

BACKGROUND OF THE INVENTION

A data storage system is typically set up so that one of the properties of elements of the system is that they are as evenly loaded as possible in terms of activity performed by the elements. Such load balancing enhances the ability of the data storage system to perform efficiently. Methods are known in the art for effecting and maintaining load balancing.

U.S. Pat. No. 6,578,068 to Bowman-Amuah, whose disclosure is incorporated herein by reference, describes a method for distributing incoming requests to a storage system. The requests are received and stored by an activity module, which instructs a client to handle a first subset of the requests and passes a second subset of the requests on to a load balancer. The load balancer sends particular requests of the second subset to a server component determined to be most appropriate to receive the request.

U.S. Pat. No. 6,604,171 to Sade, whose disclosure is incorporated herein by reference, describes managing a cache memory by using a first cache memory, copying data from the first cache memory to a second cache memory, and, following copying, using the second cache memory along with the first cache memory.

U.S. Pat. No. 6,886,074 to Narayanaswamy, et al., whose disclosure is incorporated herein by reference, describes a method for load balancing a redundant array of inexpensive disks (RAID). Data is stored on two drives, and counters of read commands for the drives are maintained. A new read command is directed to the drive having the lowest counter.

U.S. Patent Application 2005/0015554 to Zohar, et al., whose disclosure is incorporated herein by reference, refers to a data storage system having a number of caches. The disclosure describes one of the caches of the system being unable to retrieve data from or store data at a range of logical addresses. In response to the inability, one or more other caches are reconfigured to retrieve data from and store at the range while continuing to retrieve data from and store at other ranges of logical addresses.

In addition to the mechanisms described above, methods are known in the art that predict, or attempt to predict, occurrence of failure or incorrect operation in an element of a storage system. One such method, known as Self-Monitoring Analysis and Reporting Technology (SMART), incorporates logic and/or sensors into a hard disk drive to monitor characteristics of the drive. A description of SMART, by Charles M. Kozierok, titled Self-Monitoring Analysis and Reporting Technology (SMART), in The PC Guide, published in April, 2001, incorporated herein by reference. Values of the monitored characteristics are used to predict a possible pending problem, and/or provide an alert for such a problem.

Notwithstanding the methods described above, there is a need for an improved process for handling unbalanced systems.

SUMMARY OF THE INVENTION

In embodiments of the present invention, a data storage system comprises a group of mass storage devices which store respective data therein, the data being accessed by one or more hosts transmitting input/output (IO) requests to the storage system. The data is stored redundantly in the system, so that at least two mass storage devices each have a copy of the data. The IO requests comprise IO write requests, wherein data is written redundantly to at least two mass storage devices, and IO read requests, wherein data is read from one of the devices. A reduced service level is defined for the devices, typically in terms of a reduced rate of completion of IO requests compared to a characteristic service level.

During operation of the system, a storage system manager may detect the reduced level on one of the mass storage devices of the system, herein termed the suspect device. In this case, at least some IO read requests for data on the suspect device are automatically diverted to one or more other mass storage device on which the data is redundantly stored, while allowing the suspect device to continue operating at the reduced level of service. Configuring the data storage system for this sort of automatic diversion of IO read requests provides an extremely useful tool for handling service problems encountered in the system.

In one embodiment of the present invention, in addition to diverting the IO read requests, data is also copied from the suspect device, or a redundant device having the data, to one or more other mass storage devices. The data is copied in such a way as to maintain the redundancy of the data within the other mass storage devices. After the data is copied, IO write requests may also be diverted from the suspect device. Thus, load balancing and data redundancy may be maintained in the system while the suspect device operates at the reduced service level.

In a disclosed embodiment, the group of mass storage devices is divided into a number of sub-groups, each sub-group being accessed via a respective cache. Each cache acts as a controller for the devices in its sub-group, and maintains respective IO request queues for the devices. The reduced service level may be detected by comparing a number of IO requests in a specific queue to an average number of IO requests in all the queues of the sub-group. This method of monitoring the reduced service level allows each cache to detect independently if there is a reduced service level in one of its mass storage devices.

There is therefore provided, according to an embodiment of the present invention a method for operating a data storage system that includes a plurality of mass storage devices, which are configured to store data redundantly, the method including:

determining a characteristic service level of one or more of the mass storage devices;

defining a reduced service level, which is less than the characteristic service level; and performing the following steps automatically, without intervention by a human operator:

detecting the reduced service level on a first mass storage device in the data storage system;

determining that data on the first mass storage device is stored redundantly on a second mass storage device in the data storage system; and in response to detecting the reduced service level, diverting an input/output (IO) request for the data directed to the first mass storage device to the second mass storage device, while operating the first mass storage device at the reduced service level.

Typically, the characteristic service level is determined with respect to a rate of completion of IO requests.

Alternatively or additionally, the reduced service level is a preset fraction of the characteristic service level.

The method may also include:

performing iteratively the following steps:

checking after diverting the IO request if the reduced service level exists; and if the reduced service level does exist, diverting a subsequent IO request for the data directed to the first mass storage device to the second mass storage device, and if the reduced service level does not exist, servicing the further IO request at the first mass storage device.

The method may further include copying the data to a third mass storage device different from the first and the second devices, and conveying a subsequent IO request for the data to the third mass storage device.

In one embodiment, IO requests to the plurality of mass storage devices are stored in respective IO request queues for the devices prior to being serviced therein, and detecting the reduced service level includes determining that an imbalance exists in a length of one of the IO request queues compared to the other IO request queues.

In an alternative embodiment, the plurality of mass storage devices include sub-groups of mass storage devices, each sub-group having a respective cache communicating with its sub-group, each respective cache including IO request queues corresponding to the sub-group of mass storage devices communicating with the cache, each IO request queue storing IO requests for its device prior to the IO requests being serviced therein, and detecting the reduced service level includes determining that an imbalance exists in a length of one of the IO request queues of one of the respective caches compared to the other IO request queues of the cache.

The IO request may be stored in one of an IO read request queue and an IO write request queue, and detecting the reduced service level may include detecting an imbalance in a length of at least one of the read and write request queues.

Typically, diverting the IO request includes selecting one of a plurality of corrective actions, each of which actions divert the IO request. In an embodiment, a respective priority may be assigned to each of the corrective actions prior to selecting the one corrective action, and selecting the one corrective action includes selecting the one corrective action according to the respective priorities.

Typically, the reduced service level includes a transient reduction in service level or an invariant reduction in service level.

There is further provided, according to an embodiment of the present invention, apparatus for operating a data storage system, including:

a plurality of mass storage devices which are configured to store data redundantly; and a system manager, which is adapted to:

determine a characteristic service level of one or more of the mass storage devices, define a reduced service level, which is less than the characteristic service level, and perform the following steps automatically, without intervention by a human operator:

detect the reduced service level on a first mass storage device in the data storage system, determine that data on the first mass storage device is stored redundantly on a second mass storage device in the data storage system, and in response to detecting the reduced service level, divert an input/output (IO) request for the data directed to the first mass storage device to the second mass storage device, while operating the first mass storage device at the reduced service level.

The present invention will be more fully understood from the following detailed description of the embodiments thereof, taken together with the drawings, a brief description of which is given below.

DETAILED DESCRIPTION OF EMBODIMENTS

Figure 1:
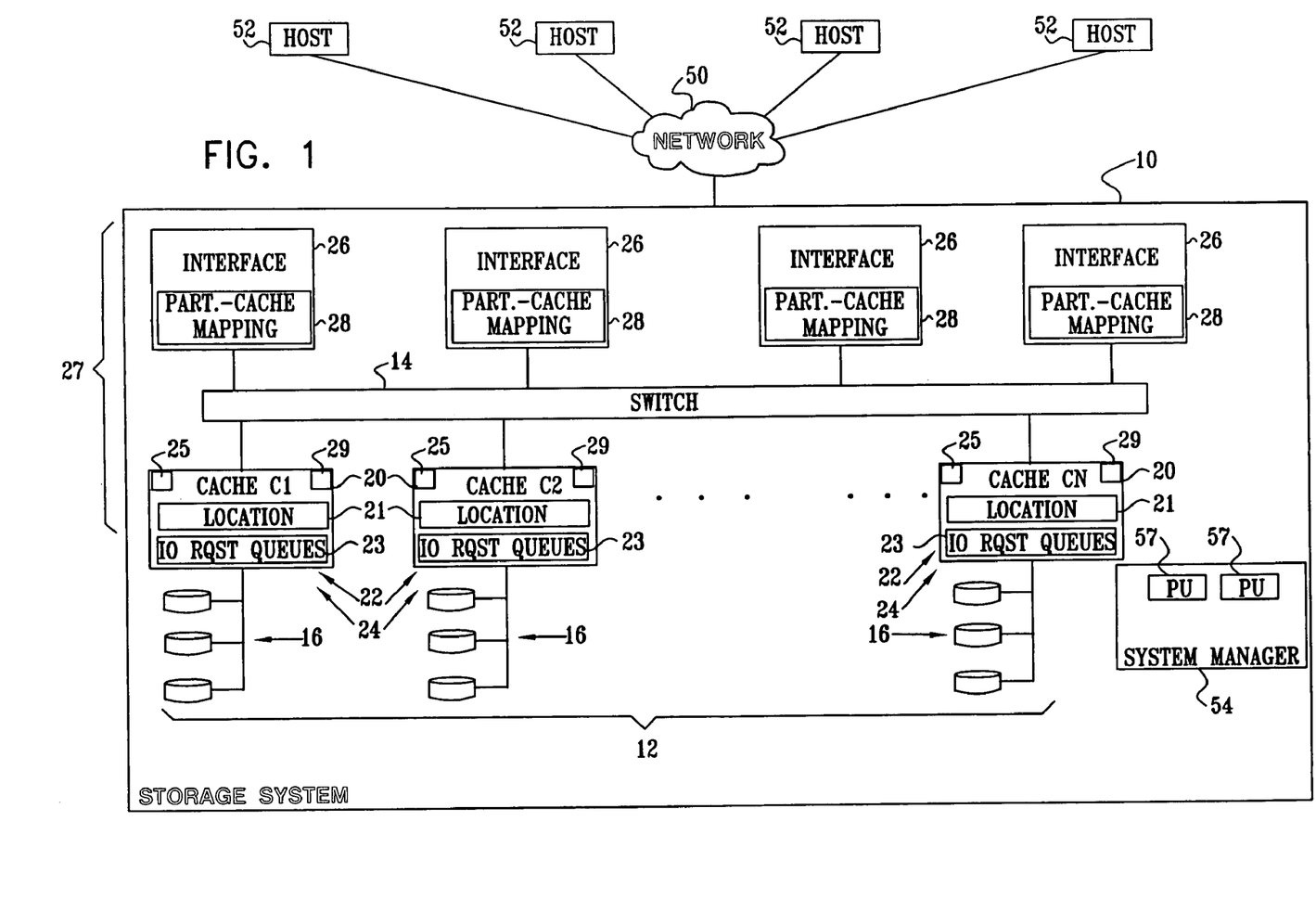
FIG. 1 is a schematic block diagram of a data storage system, according to an embodiment of the present invention.

Reference is now made to FIG. 1, which is a schematic block diagram of a storage system 10, according to an embodiment of the present invention. System 10 acts as a data memory for one or more hosts 52, which are coupled to the storage system by any means known in the art, for example, via a network such as the Internet or by a bus. Herein, by way of example, hosts 52 and system 10 are assumed to be coupled by a network 50. The data stored within system 10 is stored in logical units (LUs) at logical addresses (LAs) in a group of slow and/or fast access time non-volatile mass storage devices 12, hereinbelow assumed to be disks by way of example. As is described in more detail below, the data is stored redundantly, so that at least two copies of each block of data are stored in separate independently accessed disks 12. Hosts 52 access the data stored in disks 12 via input/output (IO) requests, which comprise IO read requests and IO write requests. In an IO read request the requested data is read from one of disks 12 wherein the data is stored. In an IO write request the data is written to at least two separate independently accessed disks 12.

Disks 12 typically incorporate a monitoring technology such as the Self-Monitoring Analysis and Reporting Technology (SMART) described in the Background of the Invention; if such a technology is incorporated, a system manager 54 may use it as is described below. Alternatively or additionally, a human operator of system 10 incorporates software and/or hardware into the system, and/or into disks 12, that enables manager 54 to monitor parameters and characteristics of the disks similar to those provided by monitoring technology. Further alternatively or additionally, U.S. patent application Ser. No. 11/123,634 filed May 6, 2005 titled "Automatic Disk Healing," which is assigned to the assignees of the present invention and which is incorporated herein by reference, describes methods and parameters for monitoring activity of disks 12; these methods and parameters may be advantageously used in system 10.

The human operator of system 10 inputs ranges of values for the parameters and/or the characteristics that, taken together or separately, provide manager 54 with one or more metrics that allow the manager to determine if each of the disks is operating satisfactorily. Using the parameters, characteristics, and/or metrics, the operator defines a characteristic service level for a disk, and a reduced service level, less than the characteristic service level for the disk. The characteristic service level typically comprises an average rate of completion of IO read and/or write requests for the system, in which case the reduced service level typically comprises a reduced rate of completion of IO read and/or write requests compared to the average rate. Hereinbelow, it is assumed, by way of example, that the rates are measured for the total of IO read and write request completions. Other definitions for a reduced service level, using system parameters such as an average latency of IO requests, and/or a maximum latency of an IO request during a specific period, will be apparent to those skilled in the art. Furthermore, the definition for reduced service may be based on measuring only IO read or only IO write requests. All such definitions are assumed to be comprised within the scope of the present invention.

Such a reduced service level typically occurs in a specific disk if the disk has a relatively large number of bad sectors, if the data stored on the disk is poorly distributed, if there is an at least partial mechanical or electrical failure in the motor driving the disk or one of the heads accessing the disk, or if a cache accessing the disk develops a fault. A characteristic of this type of reduced service level is that it is typically relatively invariant with time. This type of reduced service level may also be assumed to occur when a technology such as SMART predicts a future disk failure or problem.

In embodiments of the present invention, the reduced service level may occur because of random statistical fluctuations of numbers and/or characteristics of IO requests conveyed to a disk, rather than because of a characteristic of the disk. For example, consecutive IO requests that require large changes of position of the disk reading head will typically reduce the service level of the disk compared to consecutive IO requests requiring small or no changes of the reading head position. Typically, this type of reduced service level will be of a relatively transient nature, compared with the relatively invariant type of reduced service level described above. As described in more detail below, embodiments of the present invention correct both types of reduced service level.

System manager 54 is typically implemented as one or more manager processing units 57, which may be incorporated into disks 12, and/or other elements of system 10, by methods which will be familiar to those skilled in the art. When implemented as multiple units 57, the units typically control system 10 using a distributed algorithm operated in a cooperative manner.

LAs for system 10 are herein, by way of example, assumed to be grouped into logical unit partitions of consecutive ranges of LAs. Both LAs and logical unit partitions are allocated by system manager 54, which also acts as a control unit for the system. As is described in more detail below, each logical address has a corresponding physical address at which data is stored.

System 10 comprises one or more substantially similar interfaces 26 which receive IO read and write requests requiring access to disks 12 from hosts 52. Each interface 26 may be implemented in hardware and/or software, and may be located in storage system 10 or alternatively in any other suitable location, such as an element of network 50 or one of hosts 52.

Between disks 12 and the interfaces are a multiplicity of interim caches 20, each cache comprising memory having fast access time, and each cache being at an equal level hierarchically. Each cache 20 typically comprises random access memory (RAM), such as dynamic RAM and/or solid state disks, as well as software. Each cache 20 is coupled, by way of example, to a respective sub-group 16 of disks 12, in a one-cache-to-many-disks connection, although it will be appreciated that other cache to disk configurations may be used in system 10. Respective caches act as controllers of the disks to which they are coupled. Hereinbelow, specific caches 20 are also referred to as cache C1, cache C2, . . . cache CN, . . . where N is a natural number.

Caches 20 are coupled to interfaces 26 by any suitable fast coupling system known in the art, such as a bus or a switch, so that each interface is able to communicate with, and transfer data to and from, each cache, which is in turn able to transfer data to and from its sub-group of disks 12 as necessary. By way of example, the coupling between caches 20 and interfaces 26 is herein assumed to be by a first cross-point switch 14. Interfaces 26 operate substantially independently of each other. Caches 20 and interfaces 26 operate as a data transfer system 27, transferring data between hosts 52 and disks 12.

At setup of system 10 system manager 54 assigns logical unit partitions to each cache 20, so that each cache is able to retrieve data from, and/or store data at, the range of LAs of its assigned partitions. To implement the redundant storage described above, the ranges are chosen so that each partition is mapped to at least two caches, and to their respective sub-groups 16. A method for redundantly mapping logical address ranges to caches, the principles of which may be used in embodiments of the present invention, is described in U.S. Patent Application 2005/0015566, titled "Data Allocation in a Distributed Storage System," which is assigned to the assignees of the present invention and which is incorporated herein by reference.

The assigned partitions for each cache 20 are typically recorded in substantially similar tables stored in each interface 26, and each table is used by its interface in routing IO requests from hosts 52 to the caches. Alternatively or additionally, the assigned partitions for each cache 20 are stored in each interface 26 as a substantially similar function, or by any other suitable method known in the art for generating a correspondence between partitions and caches. Hereinbelow, the correspondence between caches and partitions is referred to as partition-cache mapping 28, and it will be understood that mapping 28 gives each interface 26 a general overview of the complete cache address space of system 10. U.S. Patent Application 2005/0015567, titled "Distributed Independent Cache Memory," which is assigned to the assignees of the present invention and which is incorporated herein by reference, describes a method that may be applied for generating mappings such as those of mapping 28.

As described in more detail below, an IO request to access data is conveyed to a specific cache, and may be serviced by the cache itself, or by the sub-group 16 connected to the cache. Thus, except as described below, each cache acts on the IO requests conveyed to it substantially independently of the other caches; similarly, each cache communicates with its respective sub-group of disks substantially independently of communication between other caches and their respective sub-groups. Each cache 20 comprises a respective location table 21 specific to the cache; the function of table 21 is described in more detail below.

In order to service its IO requests, each cache 20 maintains a set 23 of IO request queues. Each set 23 comprises one IO read request queue and one IO write request queue for each disk in the sub-group 16 of disks connected to the cache. Alternatively, each set 23 comprises one combined IO request queue for each disk, the combined queue having both IO read and IO write requests. Hereinbelow, by way of example, sets 23 are assumed to comprise a separate IO read request queue 22 and an IO write request queue 24 for each disk. Each cache 20 places its IO requests in the appropriate queue, and the requests are transmitted from the queues to the appropriate disks as the latter become available to receive a request.

In some embodiments of the present invention, a counter 25 and/or a counter 29 of actions performed by each cache 20 is maintained by the respective cache or by manager 54. The functions of these counters are described below with reference to FIG. 5 and FIG. 6.

Figure 2:
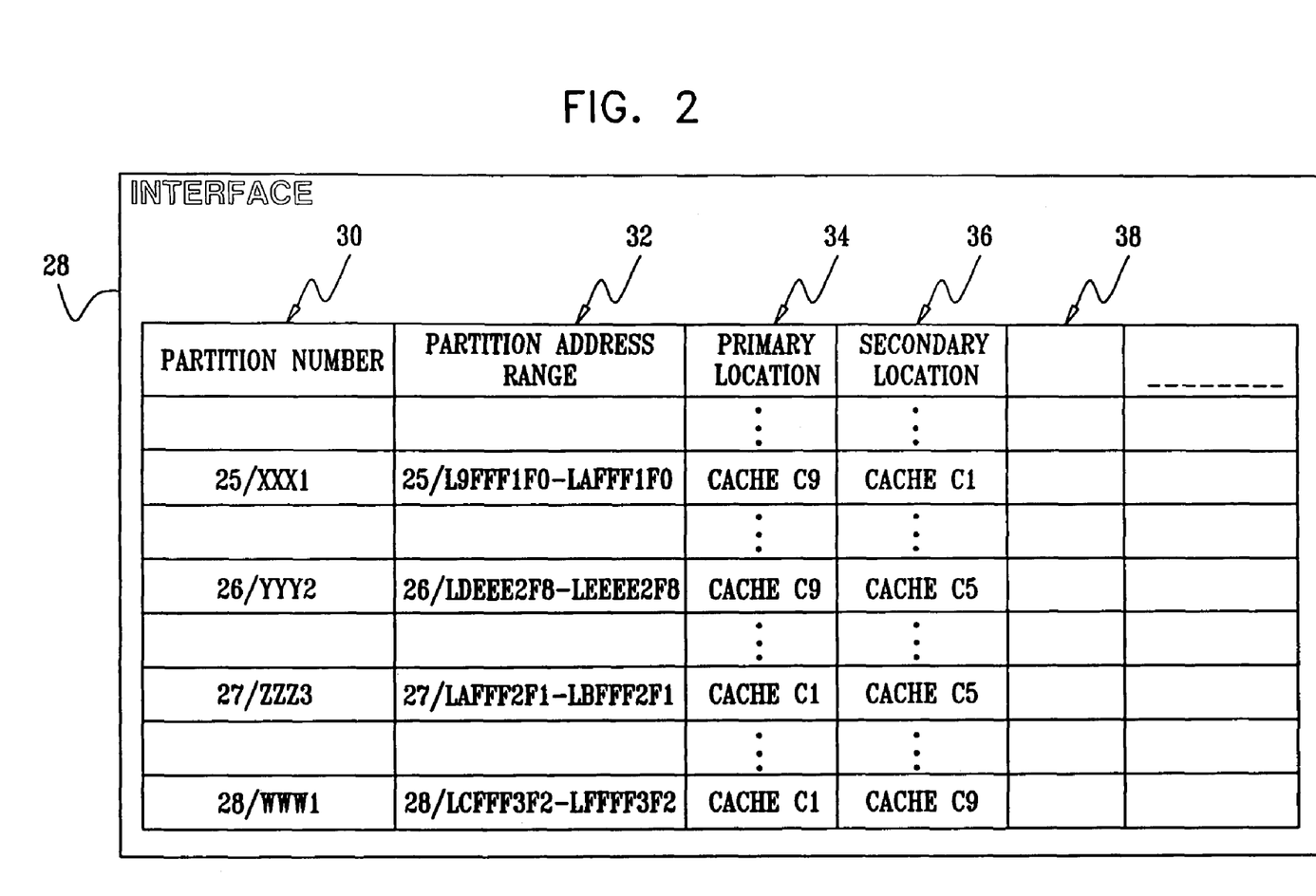
FIG. 2 is a schematic diagram of a mapping used in the system of FIG. 1, assumed to be in tabular form, according to an embodiment of the present invention.

FIG. 2 is a schematic diagram of mapping 28, assumed to be in tabular form, according to an embodiment of the present invention. Column 30 lists partition numbers in the form of LU/partition number. Column 32 lists the ranges of logical addresses of each partition in the form of LU/LA range. Each partition LA range is typically referred to by a first logical address and a range of addresses following on from the first address. Herein, to differentiate logical addresses from physical addresses, the former are prefixed by "L" and the latter by "P."

System 10 is an example of a singly-redundant data storage system, so that a third column 34 and a fourth column 36 respectively list a primary cache and a secondary cache associated with each partition, the caches being selected from caches 20 and being different from each other. It will be understood that caches other than the primary and the secondary caches exemplified here may be associated with each partition, according to the amount of redundancy incorporated into system 10, all such caches being different from each other. Thus, for a doubly-redundant system, mapping 28 includes a column 38 having a tertiary cache associated with each partition, the tertiary cache being different from the primary and secondary caches.

Each interface 26 uses its mapping 28 to direct IO requests received from hosts 52 to at least one of caches 20. Typically, each IO request comprises a logical address to which the request is directed, and the interface receiving the request uses the logical address to determine the primary location, in mapping 28, where the physical data is located. If the IO request is a read request, the interface then transmits the IO request to the primary location listed in mapping 28. If the IO request is a write request, the interface transmits the request to all the locations in mapping 28 that are listed for the logical address of the request.

As stated above, each cache 20 comprises a respective location table 21. Each location table gives its cache exact physical location details, on the sub-group 16 of the cache, for the partitions assigned to the cache. Each location table 21 also includes the one or more alternative caches assigned to the partition.

Figure 3:
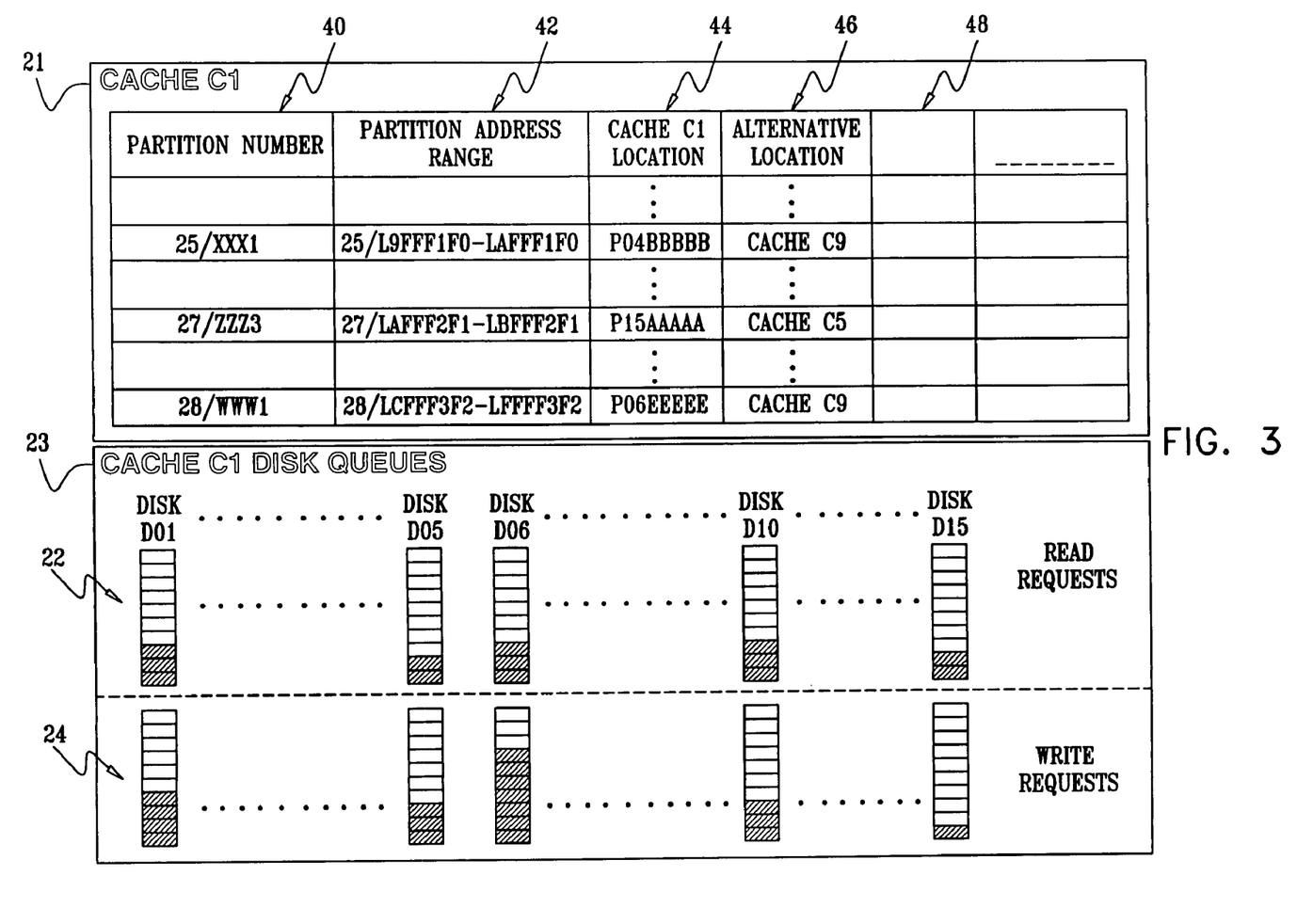
FIG. 3 is a schematic diagram of an address location table and an IO request queue set for a cache of the system of FIG. 1, according to an embodiment of the present invention.
Figure 4:
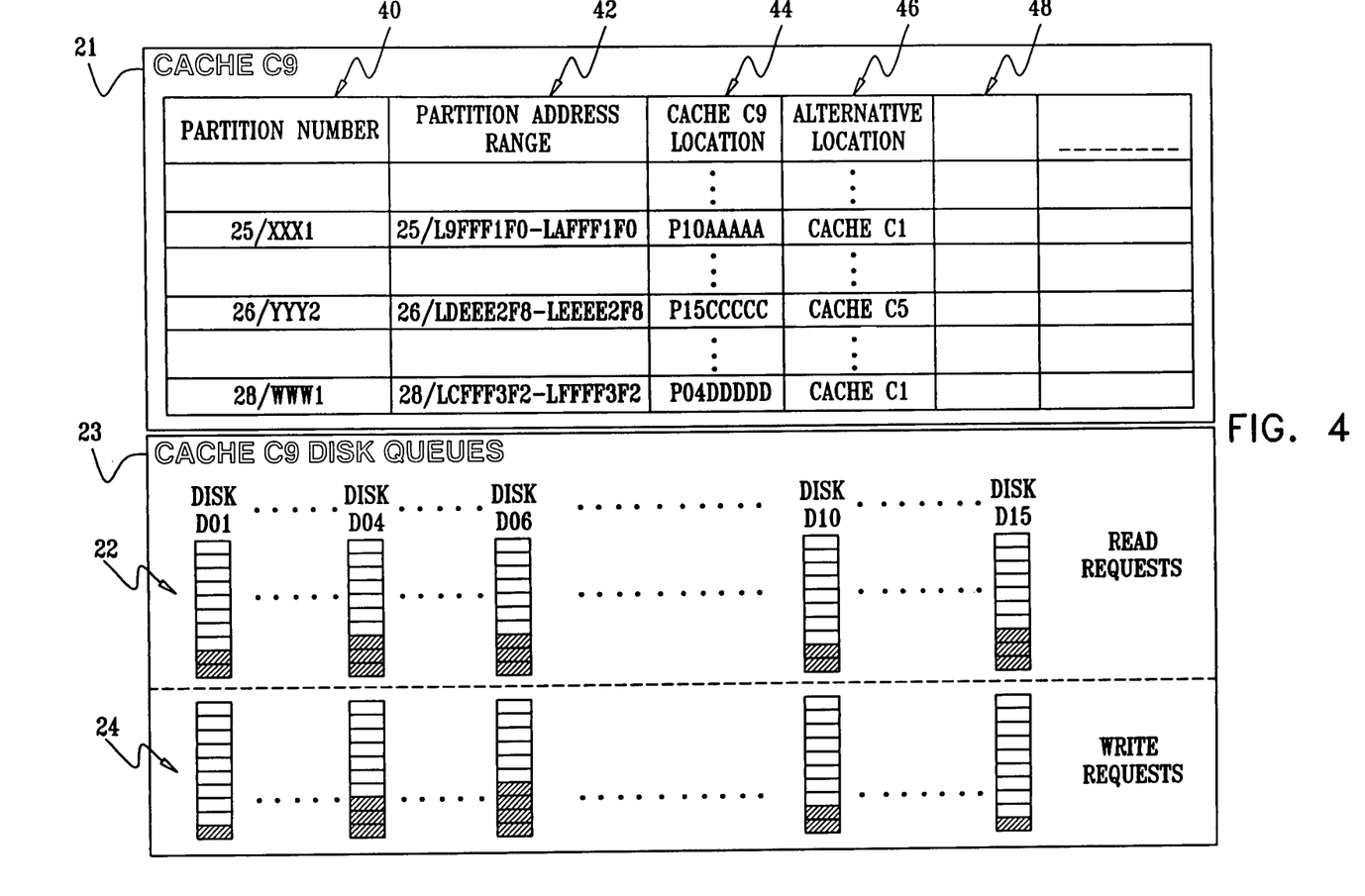
FIG. 4 is a schematic diagram of an address location table and an IO request queue set for another cache of the system of FIG. 1, according to an embodiment of the present invention.

FIG. 3 and FIG. 4 are schematic diagrams of location tables 21 and IO request queue sets 23 for cache C1 and cache C9 respectively, according to an embodiment of the present invention. Each table 21 comprises columns 40 and 42 of partition numbers and logical ranges, corresponding respectively to columns 30 and 32 of mapping 28 described above. Each column 40 and 42 has entries for partitions of the respective caches only. Thus, location table 21 for cache C1 does not have an entry for partition 26/YYY2; similarly, location table 21 for cache C9 does not have an entry for partition 27/ZZZ3.

A column 44 lists the physical location in the sub-group 16 of disks connected to the cache. By way of example each sub-group 16 is assumed to comprise 15 disks, each disk of cache CN being identified herein as disk DM, where M are natural numbers. Thus, the physical location listed in column 44 is in the form PHHXXXXX, where P indicates that the location is a physical address, HH is the number of the disk (from 01 to 15) and XXXXX is the location within the disk.

A column 46 lists an alternative cache 20 where the data of the partition of column 40 is stored. The listing of column 46 corresponds to the locations listed in columns 34 or 36 of mapping 28. It will be understood that for systems having more than single redundancy, corresponding further alternative partition locations are listed in a column 48. Thus, returning to FIG. 2, mapping 28 shows that the data for partition 25/XXX1 is located at cache C9 and cache C1. The cache C9 location table (FIG. 4) shows that the physical location of the data is at 10AAAAA, i.e., at AAAAA on disk D10 of the sub-group of disks attached to cache C9, and that an alternative location of the data is at cache C1. The cache C1 location table (FIG. 3) shows that the physical location of the data is at 04BBBBB, i.e., at BBBBB on disk D04 of the disks of cache C1, and that the alternative location of the data is at cache C9. Each cache conveys IO requests it receives, according to its location table 21, to the appropriate request queue in its queue set 23.

Each queue in set 23 is assumed, by way of example, to have up to ten spaces, which are filled and emptied in a first-in-first-out (FIFO) manner. However, it will be appreciated that any convenient queue length may be used, typical lengths being of the order of 10 to of the order of 500. It will also be appreciated that the queues may be filled and emptied in substantially any other manner known in the art. U.S. patent application Ser. No. 11/165,976 filed Jun. 24, 2005, titled "Method, System and Circuit for Managing Task Queues on a Disk Device Controller", which is assigned to the assignees of the present invention and which is incorporated herein by reference, describes a method for filling and emptying queues that may be used in the present invention. In an embodiment of the present invention, each cache monitors the length of the request queues in its respective set 23. FIGS. 3 and 4 illustrate how IO read and write request queues are filled at a particular instant in time.

System 10 is assumed to be setup to operate so that there is substantially even load balancing for IO requests conveyed to disks 12. Thus, as shown in FIG. 4, the read request queues 22 for cache C9 are filled approximately equally, as are the write request queues 24. As shown in FIG. 3, the IO read request queues 22 of cache C1 are also filled approximately equally. The write request queues 24 are filled approximately equally, except that the write queue for disk D6 is close to the maximum of ten requests. It will be appreciated the length of the disk D6 write queue may be indicative of disk D6 providing one of the types of reduced service level described above.

Figure 5:
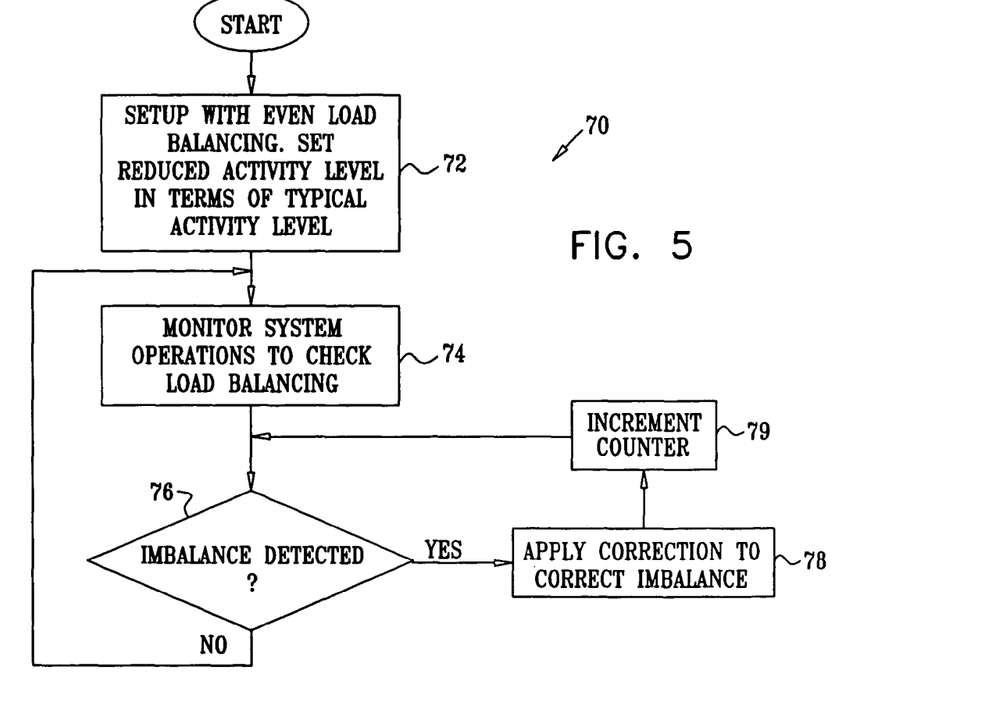
FIG. 5 is a flowchart showing steps performed in operating the system of FIG. 1, according to an embodiment of the present invention.

FIG. 5 is a flowchart 70 showing steps performed in operating system 10, according to an embodiment of the present invention. In a first step 72, system 10 is initially set up so that there is substantially even load balancing for IO requests conveyed to all disks 12. The setup may advantageously be implemented generally as described in the U.S. Patent Applications referenced above. The setup includes preparing and installing tables 21 and mapping 28 (FIGS. 2, 3, and 4), and manager 54 maintains copies of these tables. Typically, and as assumed hereinbelow unless otherwise stated, mapping 28 is generated so that each cache is allocated an approximately equal number of primary and secondary locations for its partitions. Also in first step 72, the operator of the system defines the reduced service level for disks 12 as described above, as well as a method for detecting if such a reduced level occurs. Hereinbelow, by way of example the reduced level is assumed to comprise a reduced rate of processing IO requests.

A number of methods may be used to detect the reduced service level. For example, lengths of the IO request queues may be monitored, and a relative difference from a predetermined value of queue length may be used as an indication of the reduced service level. Alternatively, rather than using a relative difference, an absolute difference, or a combination of the two types of differences, may be used. Further alternatively, the indication may comprise an adaptive criterion, for example one taking account of historical values of queue lengths and/or of rates or times of completion of IO requests that are redirected using flowchart 70.

Hereinbelow, by way of example the method for detecting the reduced service level is assumed to comprise measuring lengths of IO read request queues 22 and write request queues 24 at each cache 20. If the length of a specific IO read request queue differs from an average length of the IO read request queues 22 by a predetermined read request value, or if the length of a specific IO write request queue differs from an average length of the IO write request queues 24 by a predetermined write request value the respective disk is assumed to be operating at the reduced level. The predetermined read request and write request values are typically of the order of 30% of the maximum length of the respective type of queue.

In a system monitoring step 74, manager 54 and caches 20 monitor operations and parameters of the system to ensure that the even load balancing is maintained. Manager 54 monitors activity of interfaces 26, caches 20 and/or disks 12; caches 20 monitor the lengths of the IO request queues in their sets 23.

During normal operation of the system, even load balancing is typically a result of an even distribution of logical addresses among disks 12. In a decision step 76, system 10 is checked for an imbalance in the loading, assumed to be caused by one of disks 12, hereinbelow termed the suspect disk, performing at or below the reduced service level as defined above. As stated above, by way of example the method of checking for imbalance is for caches 20 to monitor the lengths of their IO request queues.

If in step 76 it appears that an imbalance is occurring or may occur, in a reaction step 78 the manager and/or caches 20 take action to correct the actual or possibly impending imbalance. As illustrated in flowchart 70, and as described further below, decision step 76 and reaction step 78 are typically iteratively performed until the imbalance is corrected. In some embodiments, in a step 79 counter 25 is incremented each time the iteration is performed. Once the imbalance is corrected, steps 74 and 76 are iteratively performed. The detection in step 76, and the corrections taken in step 78, are described below.

Figure 6:
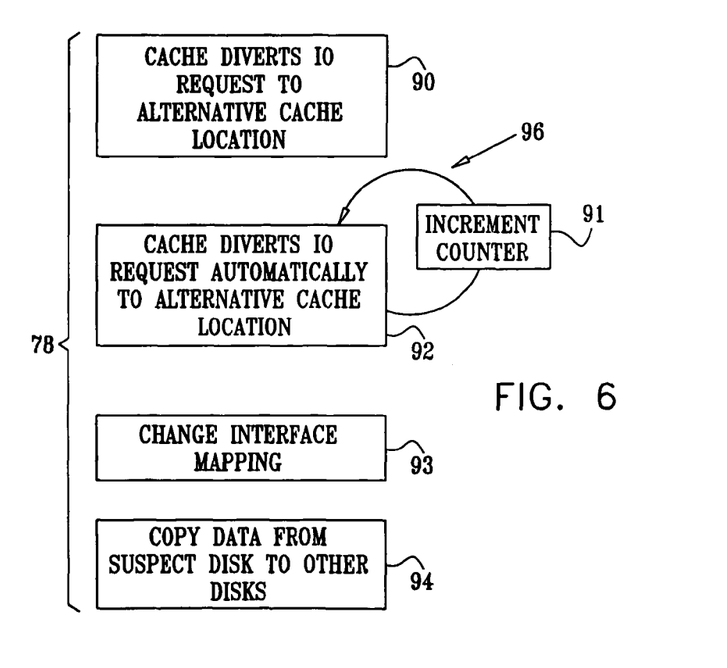
FIG. 6 lists corrective actions taken by the system of FIG. 1 in a reaction step of the flowchart of FIG. 5, according to an embodiment of the present invention.

FIG. 6 lists corrective actions taken by system 10 in reaction step 78, according to an embodiment of the present invention. In one embodiment of the present invention, corrective actions such as those described hereinbelow are prioritized, manager 54 checking, after one or more implementations of a higher priority action, if the imbalance has been corrected before performing a lower priority corrective action. Alternatively, one or more of the corrective actions may be implemented substantially independently of the other actions and the actions are not prioritized. In the descriptions of corrective actions below, it is assumed by way of example that the actions are prioritized.

A corrective action 90, assumed herein to be a highest priority action, is typically invoked when imbalance step 76 comprises one of caches 20 detecting, by way of example, that one of the queues in its disk set queue 23 is equal to or greater than the predetermined values described above. Such an occurrence is illustrated for a suspect device, i.e., disk D6, coupled to cache C1 (FIG. 3), and the queue is herein termed the enlarged queue. Action 90 comprises the cache not forwarding an IO read request to the suspect disk, but diverting the IO read request, via switch 14 (FIG. 1), to the alternative cache location listed in the cache's table 21. Thus, in the situation illustrated in FIG. 3, cache C1 sends an IO read request for partition 28/WWW1 to cache C9. In some embodiments of the present invention, cache C1 and/or manager 54 provide an indication, such as attaching a flag to the IO request, showing that the request is being conveyed to cache C9 via cache C1. Cache C9 typically uses the indication to prevent the IO read request being returned to cache C1. Once action 90 has been performed, flowchart 70 returns to the beginning of decision step 76.

A corrective action 92, assumed herein to be a lower priority action than action 90, is assumed to be invoked when IO request queues 23 have been checked a pre-determined number of times as given by counter 25, and each time action 90 has been invoked because one of the queues is enlarged. Action 92 comprises a cache automatically rerouting IO read requests for a specific disk to the alternate cache, according to the cache's location table 21, without checking in step 76 if the IO request queue causing the invocation is still enlarged. The rerouting without checking in step 76 is indicated by a curved arrow 96. In some embodiments of the present invention, the cache or manager 54 increments, in a step 91, counter 29 each time an IO read request is automatically rerouted according to action 92. Typically, if counter 29 exceeds a predetermined value, the enlarged IO request queue is checked again in step 76.

Actions 90 and 92 are typically invoked if the imbalance detected in step 76 is of a transient nature. In a disclosed embodiment of the present invention, a transient reduced service level is assumed to occur when the enlarged queue is of the order of ten or more times larger than an average of the other queues, and if the queue remains enlarged for a time period of between the order of one second and the order of ten seconds.

A corrective action 93, assumed herein to be a lower priority than action 92, may be invoked if the imbalance caused in step 76 is not corrected by action 90 or action 92. Typically, action 93 is invoked if the suspect disk continues to function at the reduced service level. Such a reduced level will be apparent to system 10 by step 76 continuing to indicate the imbalance, and/or by values of counters 25 and/or 29 exceeding preset limits.

Action 93 consists of rewriting mapping 28 so that loading on the suspect device is reduced. In the example referred to above, i.e., wherein disk D6 of cache C1 is the suspect device, cache C1 notifies manager 54 that disk D6 is suspect. Manager 54 in turn uses the information received from the cache, and the information about the distribution of partitions within the cache that it has from its copy of the cache's table 21, to rewrite mapping 28 so as to reduce the load on disk D6. The rewriting comprises switching in mapping 28 the primary and secondary locations of some or all of the partitions that are stored on the suspect device. For example, referring to the exemplary mapping 28 in FIG. 2, manager 54 may switch partition number 28/WWW1 to have its primary location at cache C9 and its secondary location at cache C1. The rewritten mapping thus changes the approximately equal number of primary and secondary locations set up in first step 72 (FIG. 5). Manager 54 transmits the rewritten mapping to all interfaces 26.

It will be understood that manager 54 may decide to only switch some of the locations of partitions on a suspect device, and that such switching may be performed in a graduated manner, manager 54 checking after each rewriting of mapping 28 if the imbalance causing a device to be suspect has been removed. Furthermore, the cache reporting the suspect device may send information on the imbalance to manager 54, such as the difference between an expected length of an IO queue and the actual length. Such information then enables manager 54 to decide what fraction of partitions should have their locations switched in mapping 28.

A corrective action 94, assumed herein to be a lower priority action than action 93, may be invoked if the imbalance caused in step 76 is not corrected by actions 90, 92, or 93. In action 94 manager 54 copies data from the suspect disk or from its corresponding redundant disks to other disks in system 10. The data is copied in a manner that maintains the redundancy of the copied data. As the copying is performed, manager 54 updates mappings 28 in interfaces 26, as well as the appropriate caches of system 10, so that both IO read and write requests are automatically diverted from the suspect disk. It will be understood that by comparing the length of the IO request queue of the suspect disk with the lengths of other IO request queues, a specific cache 20 and/or manager 54 may measure the effectiveness of the compensation generated by diverting the IO requests.

It will be appreciated that action 94 may be invoked incrementally, i.e., by copying incremental sets of data of the suspect disk. After each set has been copied, manager 54 and/or the specific cache 20 typically checks to see if the reduced service level of the suspect disk has been compensated for, for example by confirming that the suspect IO request queue has been reduced to below the predetermined value set in step 72. If the queue is below the value, manager 54 does not copy further sets from the suspect disk or its redundant disks. If the queue is not below the value, manager 54 copies a further set of data from the suspect or redundant disks, and the incremental copying and checking continues until the suspect IO request queue is below the predetermined value.

Actions 93 and 94 are typically invoked if the imbalance detected in step 76 is of an invariant nature. In the disclosed embodiment of the present invention referred to above, an invariant reduced service level is assumed to occur when the enlarged queue remains large for a greater time than the larger time value used to evaluate for the transient reduced service level.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for operating a data storage system that includes a plurality of mass storage memory disks that are configured to store data redundantly, the method comprising:

storing in the data storage system a first mapping between a given logical address, a primary mass storage memory disk, and a secondary mass storage memory disk;

storing in the primary mass storage memory disk a second mapping between the given logical address, a physical address within the primary mass storage memory disk, and the secondary mass storage memory disk;

configuring the data storage system to use the first mapping to direct a read request for data stored at the given logical address to the primary mass storage memory disk and not to the secondary mass storage memory disk;

determining a characteristic service level of one or more of the mass storage memory disk;

defining a reduced service level, which is less than the characteristic service level; and performing the following steps automatically, without intervention by a human operator:

detecting the reduced service level on the primary mass storage memory disk in the data storage system;

in response to detecting the reduced service level, rebalancing read requests using the second mapping to divert the read request for the data from the primary mass storage memory disk to the secondary mass storage memory disk, while servicing previously received read requests, previously received write requests, and currently received write requests in the primary mass storage memory disk at the reduced service level;

wherein for each mass storage memory disk, write requests are stored in a first queue only including write requests and read requests are stored in a second queue only including read requests;

wherein detecting the reduced service level comprises determining that the second queue for the primary mass storage memory disk includes an amount of read requests greater than a predetermined amount of read requests.

2. The method according to claim 1, wherein the characteristic service level is determined with respect to a rate of completion of read and write requests.

3. The method according to claim 1, wherein the reduced service level is a preset fraction of the characteristic service level.

4. The method according to claim 1, further comprising:
performing iteratively the following steps:
checking, after diverting the read request, if the reduced service level exists; and
if the reduced service level exists, diverting a subsequent read request for the data directed to the primary mass storage memory disk to the secondary mass storage memory disk, and if the reduced service level does not exist, servicing the further read request at the primary mass storage memory disk.

5. The method according to claim 1, further comprising copying the data to a third mass storage memory disk different from the primary and the secondary mass storage memory disks.

6. The method according to claim 5, further comprising conveying a subsequent request for the data to the third mass storage memory disk.

7. The method according to claim 1, wherein the plurality of mass storage memory disks comprise sub-groups of mass storage memory disks, each sub-group including a respective cache communicating with its sub-group, each respective cache comprising the first and second queues corresponding to the sub-group of mass storage memory disks communicating with the cache.

8. The method according to claim 1, wherein diverting the read request comprises selecting one of a plurality of corrective actions, each of which actions diverts the read request.

9. The method according to claim 8, further comprising assigning a respective priority to each of the corrective actions prior to selecting the one corrective action, and wherein selecting the one corrective action comprises selecting the one corrective action according to the respective priorities.

10. The method according to claim 1, wherein the reduced service level comprises a transient reduction in service level.

11. The method according to claim 1, wherein the reduced service level comprises an invariant reduction in service level.

12. The method according to claim 1, wherein the queues are managed according to a First In First Out (FIFO) scheme.

13. The method according to claim 1, wherein the predetermined quantity is a second length of the second queue of read requests.

14. The method according to claim 1, wherein the plurality of mass storage memory disks comprise respective first queues including at all times exclusively of write requests, and wherein the predetermined quantity is an average length of the respective first queues.

15. The method according to claim 1, further comprising providing an indication showing that the read request is being diverted to the secondary mass storage memory disk from the primary mass storage memory disk, and using the indication to prevent the read request being returned to the primary mass storage memory disk.

16. A method for operating a data storage system that includes a plurality of mass storage memory disks that are configured to store data redundantly, the method comprising:

storing in the data storage system a first mapping between a given logical address, a primary mass storage memory disk, and a secondary mass storage memory disk;

storing in the primary mass storage memory disk a second mapping between the given logical address, a physical address within the primary mass storage memory disk, and the secondary mass storage memory disk;

configuring the data storage system to use the first mapping to direct a read request for data stored at the given logical address to the primary mass storage disk and not to the secondary mass storage memory disk;

determining a characteristic service level of one or more of the mass storage memory disk;

defining a reduced service level, which is less than the characteristic service level; and performing the following steps automatically, without intervention by a human operator:

detecting the reduced service level on the primary mass storage memory disk in the data storage system;

in response to detecting the reduced service level, copying the data to a different mass storage memory disk from the primary mass storage memory disk and the secondary mass storage memory disk, and diverting the read request to the different mass storage memory disk, while servicing previously received read requests, previously received write requests, and currently received write requests in the primary mass storage memory disk at the reduced service level;

wherein for each mass storage memory disk, write requests are stored in a first queue only including write requests and read requests are stored in a second queue only including read requests;

wherein detecting the reduced service level comprises determining that an imbalance exists in a first length of the first queue of write requests of the primary mass storage memory disk compared to a predetermined quantity.

17. A method for operating a data storage system that includes a plurality of mass storage memory disks that are configured to store data redundantly, the method comprising:

storing in the data storage system a first mapping between a given logical address, a primary mass storage memory disk, and a secondary mass storage memory disk;

storing in the primary mass storage disk a second mapping between the given logical address, a physical address within the primary mass storage memory disk, and the secondary mass storage memory disk;

configuring the data storage system to use the first mapping to direct a read request for data stored at the given logical address to the primary mass storage memory disk and not to the secondary mass storage memory disk;

determining a characteristic service level of one or more of the mass storage memory disks;

defining a reduced service level, which is less than the characteristic service level; and performing the following steps automatically, without intervention by a human operator:

detecting the reduced service level on the primary mass storage memory disk in the data storage system;

in response to detecting the reduced service level, altering the first mapping to a reconfigured mapping, and using the reconfigured mapping to direct the read request for data stored at the given logical address to a different mass storage memory disk from the primary mass storage memory disk and not to the primary mass storage memory disk while servicing previously received read requests, previously received write requests, and currently received write requests in the primary mass storage memory disk at the reduced service level;

wherein for each mass storage memory disk, write requests are stored in a first queue only including write requests and read requests are stored in a second queue only including read requests;

wherein detecting the reduced service level comprises determining that an imbalance exists in a first length of the first queue of write requests of the primary mass storage memory disk compared to a predetermined quantity.

* * * * *